United States Patent
Badding et al.

(10) Patent No.: US 9,624,136 B2
(45) Date of Patent: Apr. 18, 2017

(54) TRANSPARENT SPINEL ARTICLE AND TAPE CAST METHODS FOR MAKING

(71) Applicant: Corning Incorporated, Corning, NY (US)

(72) Inventors: Michael Edward Badding, Campbell, NY (US); Weiguo Miao, Horseheads, NY (US); Nathan Michael Zink, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 26 days.

(21) Appl. No.: 14/736,935

(22) Filed: Jun. 11, 2015

(65) Prior Publication Data

US 2016/0002117 A1    Jan. 7, 2016

Related U.S. Application Data

(60) Provisional application No. 62/019,649, filed on Jul. 1, 2014.

(51) Int. Cl.
*C04B 35/443* (2006.01)
*C04B 35/645* (2006.01)
(Continued)

(52) U.S. Cl.
CPC ........ *C04B 35/6455* (2013.01); *C04B 35/443* (2013.01); *C04B 35/6261* (2013.01); *C04B 35/62625* (2013.01); *C04B 35/638* (2013.01); *C04B 2235/5409* (2013.01); *C04B 2235/5445* (2013.01); *C04B 2235/5454* (2013.01); *C04B 2235/606* (2013.01); *C04B 2235/608* (2013.01); *C04B 2235/6025* (2013.01); *C04B 2235/6562* (2013.01); *C04B 2235/6565* (2013.01); *C04B 2235/6567* (2013.01); *C04B 2235/6585* (2013.01); *C04B 2235/661* (2013.01); *C04B 2235/663* (2013.01); *C04B 2235/72* (2013.01); *C04B 2235/721* (2013.01);
(Continued)

(58) Field of Classification Search
None
See application file for complete search history.

(56) References Cited

U.S. PATENT DOCUMENTS

| | | | |
|---|---|---|---|
| 3,479,132 A | 11/1969 | Wickham | |
| 3,531,308 A | 9/1970 | Bagley | |

(Continued)

FOREIGN PATENT DOCUMENTS

| | | |
|---|---|---|
| CA | 826707 | 11/1969 |
| CN | 101331530 | 12/2008 |

(Continued)

OTHER PUBLICATIONS

M. Beck et al., "Lamination and sintering behavior of tape cast, transparent Mg-Al-spinel ceramics", Ceramics International, 41 (2015), 3853-3859.

(Continued)

*Primary Examiner* — David Sample
(74) *Attorney, Agent, or Firm* — John L. Haack

(57) ABSTRACT

A transparent, tape casted, spinel article, as defined herein. Also disclosed is a method of method of making the tape casted, transparent spinel, and laminates of the tape casted. transparent spinel, as defined herein.

3 Claims, 15 Drawing Sheets

(51) Int. Cl.
*C04B 35/626* (2006.01)
*C04B 35/638* (2006.01)

(52) U.S. Cl.
CPC .. *C04B 2235/725* (2013.01); *C04B 2235/726* (2013.01); *C04B 2235/728* (2013.01); *C04B 2235/77* (2013.01); *C04B 2235/785* (2013.01); *C04B 2235/786* (2013.01); *C04B 2235/96* (2013.01); *C04B 2235/9653* (2013.01); *C04B 2237/343* (2013.01); *C04B 2237/704* (2013.01)

(56) References Cited

U.S. PATENT DOCUMENTS

| | | | |
|---|---|---|---|
| 4,273,587 | A | 6/1981 | Oda |
| 4,543,346 | A | 9/1985 | Matsui |
| 4,584,151 | A | 4/1986 | Matsui |
| 5,152,940 | A | 10/1992 | Shibata |
| 6,248,678 | B1 | 6/2001 | Pinckney |
| 7,611,661 | B1 | 11/2009 | Villalobos |
| 7,799,267 | B2 | 9/2010 | Messing |
| 8,142,709 | B2 | 3/2012 | Frage et al. |
| 2004/0266605 | A1 | 12/2004 | Villalobos |
| 2009/0029071 | A1 | 1/2009 | Nakayama |
| 2009/0108507 | A1* | 4/2009 | Messing ............... C04B 35/44 264/605 |
| 2009/0220790 | A1 | 9/2009 | Kim |
| 2009/0297851 | A1 | 12/2009 | Frage |
| 2010/0111803 | A1* | 5/2010 | Brun ............... B82Y 30/00 423/331 |
| 2014/0364299 | A1* | 12/2014 | Sastri ............... C04B 35/10 501/152 |
| 2015/0344372 | A1* | 12/2015 | Hutzler ............... C04B 35/443 501/153 |

FOREIGN PATENT DOCUMENTS

| | | |
|---|---|---|
| CN | 102066285 | 5/2011 |
| EP | 2112127 | 10/2009 |
| EP | 1962260 | 8/2010 |
| EP | 2450320 | 5/2012 |
| GB | 1245005 | 9/1971 |
| GB | 2031399 A | 4/1980 |
| GB | 2031399 B | 8/1982 |
| JP | 55027837 | 2/1980 |
| JP | 59121158 | 7/1984 |
| JP | 62257102 A | 11/1987 |
| JP | 2018354 A | 1/1990 |
| JP | 2212357 | 8/1990 |
| JP | 3241300 | 10/1991 |
| JP | 4016552 | 1/1992 |
| JP | 4124061 | 4/1992 |
| JP | 4124062 | 4/1992 |
| JP | 2002154870 | 5/2002 |
| JP | 2002353355 | 12/2002 |
| JP | 03440299 | 7/2003 |
| JP | 03703737 | 10/2005 |
| JP | 2005338160 | 12/2005 |
| KR | 2008093019 | 10/2008 |
| WO | 2007069644 | 6/2007 |
| WO | 2008090909 | 7/2008 |
| WO | 2009038674 | 3/2009 |
| WO | 2009134483 A2 | 11/2009 |
| WO | 2009134483 A9 | 11/2009 |
| WO | 2009144733 | 12/2009 |

OTHER PUBLICATIONS

International Search Report, issued in connection with corresponding PCT application No. PCT/US2015/038429, Sep. 24, 2015.
"Tape Casting of Al2O3, MgO, and mgAl2O4 for the Manufacture of Multilayer Composites for Refractory Applications", Int. J. Appl. Ceram. Technol., 9[2] 329-40 (2012).
http://itp.web.nitech.ac.jp/en/results/images/rr2011_hattori.pdf—an internal report by a Japanese student—downloaded Jun. 11, 2015, Kotaro Hattori.

* cited by examiner

овоpen
TRANSPARENT SPINEL ARTICLE AND TAPE CAST METHODS FOR MAKING

This application claims the benefit of priority under 35 U.S.C. §119 of U.S. Provisional Application Ser. No. 62/019,649 filed on Jul. 1, 2014 the content of which is relied upon and incorporated herein by reference in its entirety.

The entire disclosure of publications and patent documents mentioned herein are incorporated by reference.

BACKGROUND

The present disclosure generally relates to a tape casting method for making thin transparent spinel and laminate transparent spinel.

SUMMARY

In embodiments, the present disclosure provides one or more of:

a tape casting method of making a transparent spinel sheet;

a tape casting method of making a transparent spinel sheet based on an aqueous binder system;

a tape casting method which provides a uniform green microstructure throughout the thickness of the casted tape;

a tape casting method of making a transparent spinel sheet without or in the absence of a sintering aid;

a tape casting method of making a transparent spinel sheet that provides a uniform green tape having a solids-loading of, for example, from 35 to 85 vol %;

a tape casting method of making a transparent spinel sheet, which method provides very thin tapes, for example, of from 10 micrometers to 1 millimeter via tape casting, suitable for lamination to a desired thickness of several centimeters or more; and a tape casting method of making a transparent spinel sheet, which method can be accomplished using either aqueous tape casting or non-aqueous tape casting.

BRIEF DESCRIPTION OF THE DRAWINGS

In embodiments of the disclosure:

FIGS. 1A to 1I show an exemplary flow chart for the disclosed tape casting process accomplished on a laboratory scale.

DETAILED DESCRIPTION

Figure 1A:
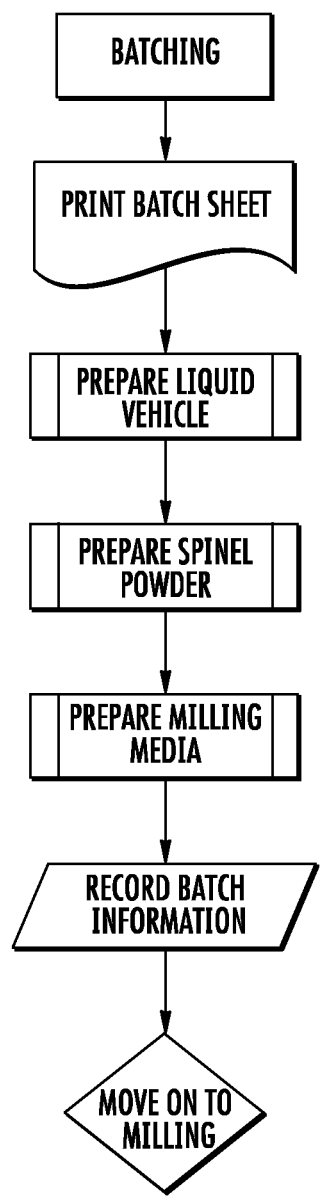
Figure 1B:
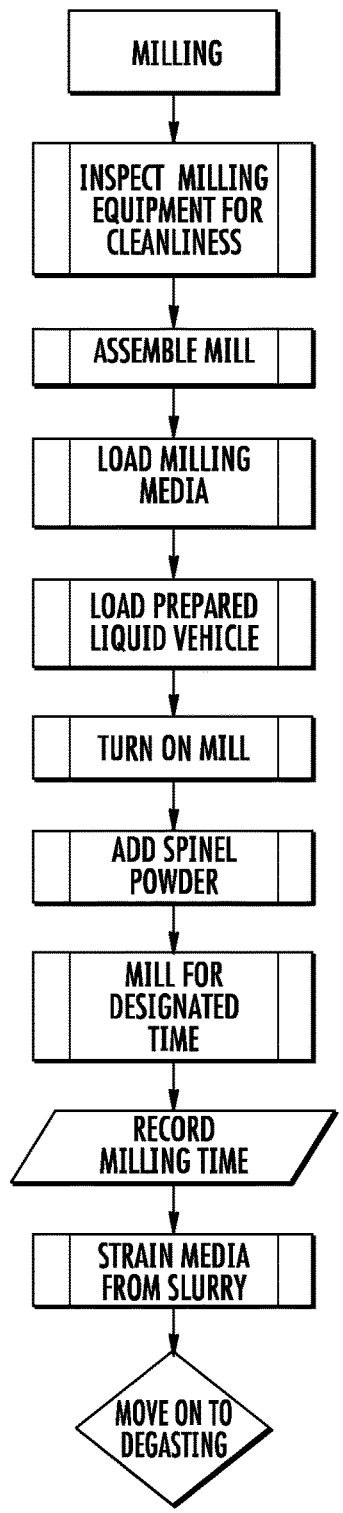
Figure 1C:
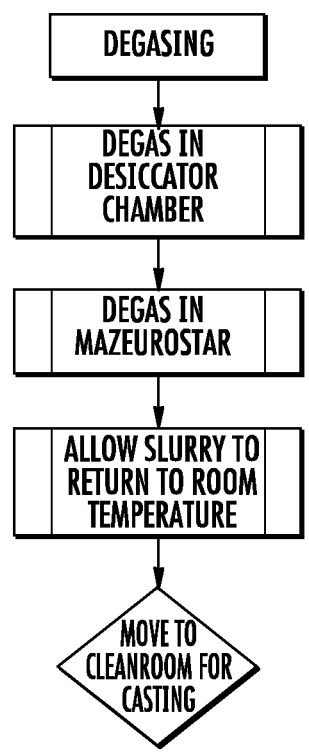
Figure 1D:
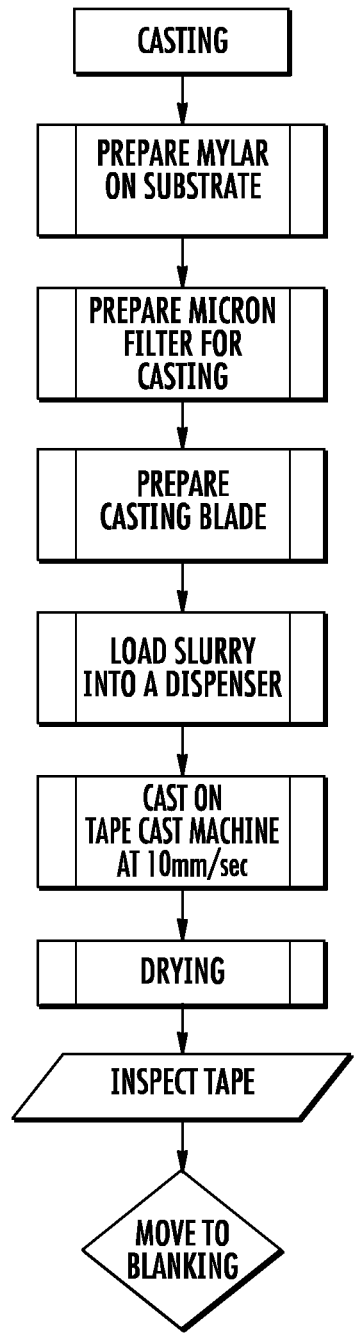
Figure 1E:
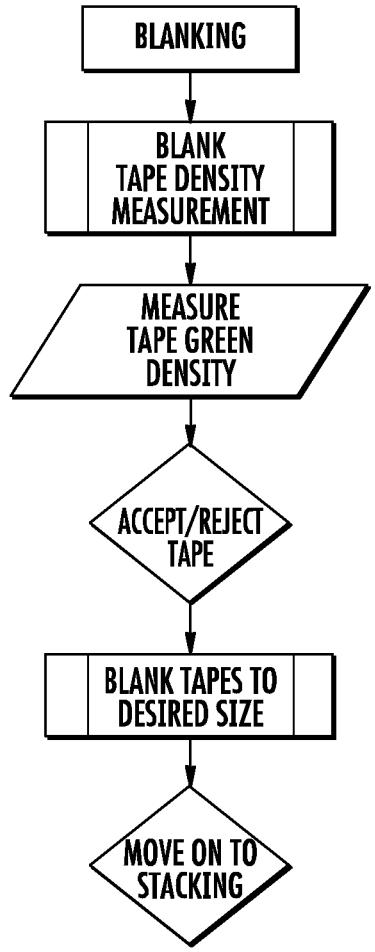
Figure 1F:
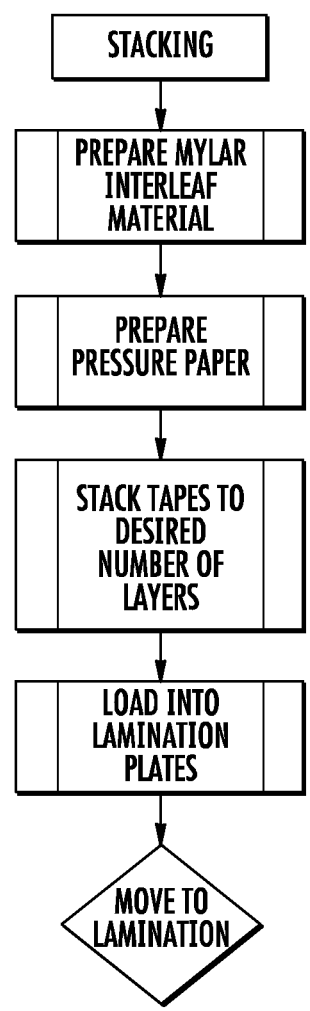
Figure 1G:
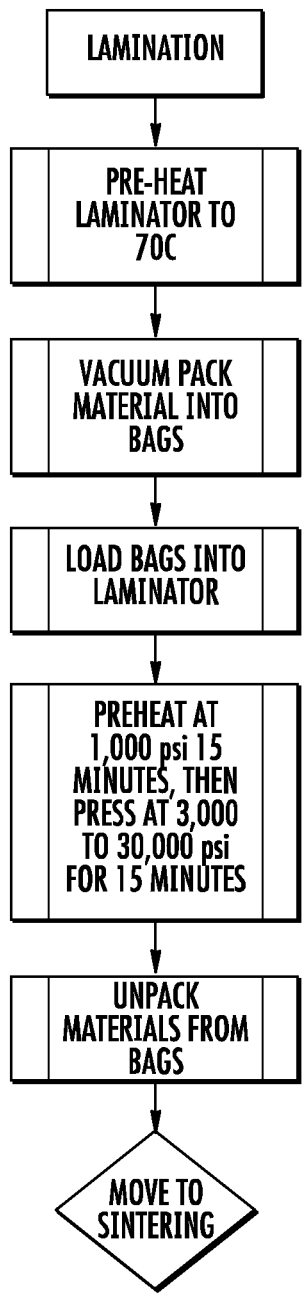

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Definitions

"Volume percent solids loading," "vol % solids loading," or like expressions refer to the inorganic solids in the casted tape. Vol % solids loading only takes into account the inorganic components (i.e., spinel). Typical vol % solids loading can be, for example, from 45 to 65 vol %, from 50 to 65 vol %, from 55 to 65 vol %, from 60 to 65 vol %, including intermediate values and ranges.

"Tape green density" refers to the combination of the spinel powder (the inorganic component) and the binder system (the organic component) in the tape in $g/cm^3$. Green density is a representation of the amount of porosity in the tape, which considers both the organic and inorganic components. Typical tape green density can be, for example, from 75 to 95% depending, for example, on the starting powder and organic content. Table 8 provides a comparison of tape composition (vol %) and tape green density ($g/cm^3$) of disclosed example formulations.

"Transmittance" refers to the fraction of incident light at a specified wavelength that passes through a sample.

"Transparency" refers to the property of the spinel that permits light to pass through without being scattered.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

In embodiments, the present disclosure provides a tape casting method for making a thin sheet of transparent spinel. Spinel is a ceramic having excellent transmission properties in the visible spectrum and in portions of the ultraviolet and infrared wavelength regions. Transparent spinel has been widely researched for over forty years. However, due to issues related to hydrolysis, a commercially viable aqueous-based slurry process for spinel manufacture has not been reported. Consequently, all of the past forming work has focused on the dry pressing of spinel powder using, for example, a uni-axial, a cold isostatic, or a hot isostatic press. A major issue with dry pressing is the non-uniformity of the green body, which results in inferior attributes of the final product.

Dry pressing can also present limitations in the overall thickness of parts that can be made. In general, thicknesses of 1 mm can be achieved. However, high aspect ratio parts need to be much thicker than this, for example, 1 cm or more.

In embodiments, the present disclosure provides a range of sheet thickness from thin sheets, for example, having a thickness of from 10 to 15 micrometers, to thicker sheets, for example, having a thickness of from 40 to 100 micrometers, which thin sheets, intermediate thickness sheets, thick sheets, or combinations thereof, can be laminated to achieve a desired thickness of up to several centimeters or more.

Existing processes have also encountered considerable difficulty in attaining both transparency and strength targets. In the existing processes, parts must be fully densified, typically through use of a lithium fluoride (LiF) sintering aid, to achieve optical transparency. The sintering aid causes exaggerated grain growth and can result in a typical grain size larger than 100 micrometers, post-sintering. This results in a dramatic decrease in strength. The presently disclosed tape casting process yields extremely high green densities, for example, 75 to 95% of the theoretical tape density, which eliminates the need for sintering aids. This allows grain sizes to remain smaller, e.g., less than 5 micrometers, resulting in far superior sintered strength compared to spinel parts prepared with a sintering aid. The reduced grain size results in higher sintered part strength. Parts that were prepared with a sintering aid typically have a strength of, for example, 100 to 200 MPa, corresponding to the grain size 100 to 200 micrometers. In contrast, disclosed parts prepared without the sintering aid have a smaller grain size and have a sintered strength of, for example, 300 to 500 MPa, corresponding to grain size less than 10 micrometers.

One industry practice is to use hot pressing to form transparent spinel. Due to part-size and throughput limits, this is an expensive process. Accordingly, potential product applications are constrained to cost-indifferent markets such as military and defense systems, or niche products. Practical use in broader markets such as consumer electronics is foreclosed. Another advantage of the disclosed process is the significantly decreased cost for transparent spinel products, creating significant commercial potential.

In embodiments, the disclosure provides both aqueous- and non-aqueous-based tape-casting methods and provide data demonstrating the production of transparent spinel having highly desirable properties.

In embodiments, the disclosure provides a transparent, tape casted, spinel article, comprising:
at least one of:
a single layer thickness of 10 to 300 micrometers, or
a laminate comprising a plurality of laminated single layers, the laminate having a thickness of 50 micrometers to 10 millimeters, or more;
the spinel article having:
a transparency of 80% to 87%, e.g., 84% to 87% based on 87% maximum theoretical transparency; and
a sintered grain size of, for example, from 1 to 7 micrometers, from 2 to 7 micrometers, from 3 to 6 micrometers, from 4 to 5 micrometers, including intermediate values and ranges.

In contrast, the prior art mentions transparent tape casted spinel using a sintering aid, such as lithium fluoride, having a sintered grain size of from 100 to 200 micrometers, see for example, armorline.com/pdf/ArmorLine%20Corp-Transparent%20Spinel%20Brochure.pdf.

In embodiments, the spinel article comprises a spinel powder having a narrow median particle size diameter of from 80 to 500 nanometers and a relatively low BET surface area (SA) of from 5 to 30 $m^2/g$ prior to firing.

In embodiments, the spinel comprises a spinel powder having a narrow median particle size diameter of 100 to 300 nanometers and relatively low BET surface area 6 to 15 $m^2/g$ prior to firing.

In embodiments, the spinel article can have a Knoop hardness number measured with a 200 g load of from 10 to 16 GPa, of from 11 to 15 GPa, of from 12 to 15 GPa, such as 14.1 GPa, including intermediate values and ranges.

Sintered grain size measurements were obtained for three transparent spinel samples that were prepared from S15CR spinel particles using different hot isostatic pressing (HIPing) conditions:
4.6 microns at 1550° C., 4 hr HIP;
3.6 microns at 1500° C., 4 hr HIP; and
2.8 microns at 1475° C., 4 hr HIP.

In embodiments, the spinel article has a purity of from 99.5% to 99.9 wt %, and has a low sulfur content of from 0.01 wt % to 0.001 wt %, or less.

In embodiments, the disclosure provides a method of making a tape casted transparent spinel, comprising:
attrition milling, for from 10 min to 10 hrs, preferably from 30 mins to 6 hrs, and more preferably from 1 to 3 hours, to form a slurry, a batch mixture comprising a spinel powder having a mean particle size of from 75 to 500 nanometers, preferably from 100 to 500 micrometers, and more preferably from 200 to 400 micrometers, a binder, a dispersant, a plasticizer, a defoaming agent, and an aqueous solvent;
degassing the resulting isolated slurry under vacuum;
tape casting the degassed slurry to a wet thickness of from 20 to 2,000 micrometers, preferably from 50 to 1,000 micrometers, and more preferably from 100 to 500 micrometers;
controlled drying of the tape casted slurry using an under-bed heater and heated flowing air at from 20 to 100° C., preferably from 40 to 80° C., and more preferably from 60 to 70° C., of the tape casted slurry to form a green tape having a dry thickness of from 5 to 1,000 micrometers, preferably from 20 to 500 micrometers, and more preferably from 40 to 200 micrometers; and firing the green tape for a sufficient time and temperature to provide the sintered transparent spinel.

In embodiments, the method can further comprise laminating the green tape into a plurality of green tape layers, that is two or more layers or multiple layers, such as from 2 to about 28 layers, wherein the laminating can be accomplished by, for example, compression methods.

In embodiments, the spinel powder, prior to introduction into the slurry, has a BET surface area of from 2 to 30 $m^2/g$, more preferably from 5 to 20 $m^2/g$, and even more preferably from 6 to 15 $m^2/g$, and most preferably 6 to 8 $m^2/g$. In embodiments, the surface area of one preferred spinel powder was 15 $m^2/g$, and having a mean particle size distribution of from 50 to 1,000 nm, more preferably from 100 to 600 nm, and even more preferably from 200 to 400 nm. A caveat regarding PSD measurement methods is that they measure agglomerate size and are not especially reliable for nano powders.

In embodiments, the spinel powder has a ceramic solids loading in the slurry of, for example, from 5 to 60 vol %, preferably from 10 and 40 vol %, and more preferably from 15 to 25 vol %, and the green tape has a ceramic solids loading of, for example, from 35 and 85 vol %, preferably from 45 and 75 vol %, and more preferably from 55 and 75 vol %, which solids loading levels permit sintering of the ceramic to high transparency. In embodiments, a preferred green tape had a solids loading from 45 to from 55 vol %.

In embodiments, firing the green tape can comprise, for example:

sintering the green tape and accomplishing binder burn out (BBO), for example, at 1500 to 1600° C. for 2 to 8 hrs to obtain a sintered transparent spinel;

hot isostatic pressing ("HIPing"), such as in an inert gas atmosphere of argon, the sintered transparent spinel, for example, at 1500 to 1600° C. for 4 to 12 hr ° C., and a pressure, for example, of from 5 to 60 kpsi, preferably from 10 to 40 kpsi, and more preferably from 20 to 30 kpsi. In embodiments, a successful hot isostatic pressing was accomplished at about 29 kpsi or about 200 MPa, to reduce residual porosity in the spinel, wherein the total porosity of the sintered transparent spinel after hot isostatic pressing is less than about 500 ppm, preferably less than about 200 ppm, more preferably less than about 100 ppm, even more preferably less than about 50 ppm, including intermediate values and ranges; and oxygen hot isostatic pressing ("$O_2$ HIP") of the HIP sintered transparent spinel, for example, at 1000 to 1200° C. for 2 to 8 hrs, and a pressure of from 0.2 to 30 kpsi, preferably from 1 to 20 kpsi, and more preferably from 5 to 10 kpsi including intermediate value of ranges.

In embodiments, a successful oxygen hot isostatic pressing was accomplished at 8 to 10 kpsi, to reduce objectionable color centers in the resulting oxygen, hot isostatic pressed, sintered transparent spinel. Hot isostatic pressing (HIP) is a manufacturing process used to reduce the porosity and to increase the density of many ceramic materials. This improves the material's mechanical properties and workability. The HIP process subjects a component to both elevated temperature and isostatic gas pressure in a high pressure containment vessel. The most widely used pressurizing gas is argon. An inert gas can be used, so that the material does not chemically react. A HIP chamber is heated, causing the pressure inside the vessel to increase. Many systems use associated gas pumping to achieve the necessary pressure level. Since pressure is applied to the material from all directions the pressing is "isostatic".

In embodiments, the firing can be accomplished in one or two steps to provide the sintered tape cast transparent spinel. In a one-step firing process the BBO and sintering is accomplished in same furnace, then $H_2$ atmosphere or HIP. In a two-step firing process the BBO and sintering are accomplished in separate furnaces, then $H_2$ atmosphere or HIP.

In embodiments, the firing can be accomplished free of a sintering aid.

In embodiments, the aqueous solvent can be deionized water.

In embodiments, the at least one step of the method is accomplished in a particulate controlled environment, e.g., a Class 100 clean room, a Class 1000 clean room, or like controlled environment having low or no particulate contamination. Additionally, the particulate controlled environment can be chemically clean and biologically sterile.

In embodiments, the green tape has a porosity, for example, of from about 0.01 to about 25 vol %, preferably from 1 and 20 vol %, and more preferably from 2 to 10 vol %, including intermediate value of ranges. In embodiments, a successful green tape had a porosity, prior to lamination processing, of from 7 to 17 vol %.

In embodiments, the method can further comprise shape forming, i.e., green forming, the green tape into a desired shape or object, e.g., other than a sheet, or a windable tape.

In embodiments, the method can further comprise filtering the degassed slurry to remove contaminants, which contaminants are large particulate or large scale contaminants, such as milling media, etc., or agglomerates that are larger than the primary particles.

In embodiments, the method can further comprise surface finishing the sintered transparent spinel to a desired thickness and surface texture.

In embodiments, sintering a tape or a tape laminate was insensitive to either the amount of the binder in the tape cast slurry, or the porosity of the green tape, if the green tape ceramic solids loading was greater than 45 volume percent, that is, advantageously slight variations in binder content or in green tape porosity did not significantly alter the quality of the sintered tape or sintered laminate products.

In embodiments, the microstructure of the preferred green tape is homogeneous when observed in an SEM image. For example, excellent particle de-agglomeration is observed. The particles are approximately evenly spaced having binder and porosity situated between the particles, see for example, FIG. 3 (lower middle image of S15CR green tape) having an excellent microstructure, and FIG. 3 (lower right image of S8CR green tape) having a comparatively poor microstructure (S8 tape). The differences in homogeneity among the tapes prepared from different sized particles is readily apparent.

In embodiments, a tape cast transparent spinel article can be prepared by the preparative methods disclosed herein.

In embodiments, a tape cast and laminated transparent spinel article can be prepared by the preparative methods disclosed herein.

In embodiments, the present disclosure provides a tape casting method of making a transparent spinel sheet.

In embodiments, the disclosure provides a tape casting method of making a transparent spinel sheet having an aqueous binder system including a dispersant. The binder system including a dispersant has an relatively high basic pH, such as from 8.5 to 13, from 9 to 12, from 9.5 to 11, from 9.5 to 10.5, including intermediate values and ranges, which basic pH can be achieved with, for example, aqueous ammonia, and which binder system prevents hydrolysis and gelation of the spinel powder during slurry preparation and casting.

In embodiments, the disclosure provides a tape casting method of making a transparent spinel sheet, which method provides a uniform green microstructure throughout the thickness of the casted tape. The uniform green microstructure can be accomplished by, for example, using a starting spinel powder having a well-defined specific surface area of, for example, from 2 to 30 $m^2/g$, more preferably from 5 to 20 $m^2/g$, and even more preferably from 6 to 8 $m^2/g$, and a very narrow particle size distribution of, for example, from 50 to 1,000 nm, more preferably from 100 to 600 nm, and even more preferably from 200 to 400 nm. Though extensive experimentation, it was discovered that it was possible to make the disclosed transparent ceramic, such as transparent spinel, using a tape casting method if the starting spinel powder had a surface area and particle size distribution powder properties corresponding to those described above.

In embodiments, the disclosure provides a tape casting method of making a transparent spinel sheet, having a uniform green tape having a solids-loading of from 35 to 85 vol %, more preferably of from 45 to 65 vol %, and even more preferably of from 55 to 65 vol %, which solids-loading permits sintering to transparency. Without a sufficiently high green density as obtained by the disclosed method it was not possible to achieve a transparent spinel. Though extensive experimentation, it was also discovered that it was not possible to make the disclosed transparent ceramic, such as transparent spinel, using a tape casting method if the green tape solids-loading and resulting green density were other than those described above.

In embodiments, the disclosure provides a tape casting method of making a transparent spinel sheet, which method can make very thin tapes of, for example, from 10 micrometers to 1 millimeter via tape casting, and the very thin tapes can then be laminated to a desired thickness of several centimeters or more. Although not wishing to be limited by theory, the thickness of the transparent laminate available using the disclosed method is limited only by the size of the available lamination equipment.

In embodiments, the disclosure provides a tape casting method of making a transparent spinel sheet, which method can be accomplished using either aqueous tape casting (e.g., water alone or in combination with miscible solvents such as alcohols) or non-aqueous tape casting if desired (e.g., with solvents such as ethanol, toluene, or MEK, and a PVB or carbonate binder system).

The disclosed composition, articles, and methods are advantaged by providing, for example, at least one of the following:

A tape casting method that forms high density green tapes that allows sintering of the transparent spinel without the use of a sintering aid. The absence of a sintering aid limits grain growth during the sintering process. This results in a final grain size of about 1 to 5 micrometers, compared to grain sizes of greater than 100 micrometers when using a LiF sintering aid and a hot pressing method. The smaller grain size can provide significantly increased strength to the resulting spinel when compared to other commercially available spinels (e.g., Surmet or Armorline).

A tape casting and lamination method that is scalable to a large scale and low cost compared to other commercially available processes. For example, the disclosed tape casting method can produce a transparent sheet material having properties similar to synthetic sapphire crystal, at a fraction of the cost (e.g., 50% or less).

A tape casting and lamination method that has flexibility to make parts of different thicknesses.

A tape casting and lamination method that can make large, thin, flat sheets for consumer electronics applications.

A tape casting and lamination method that uses existing process equipment.

Referring to the Figures, FIGS. 1A to 1I show a flow chart for the disclosed tape casting process.

Figure 2:
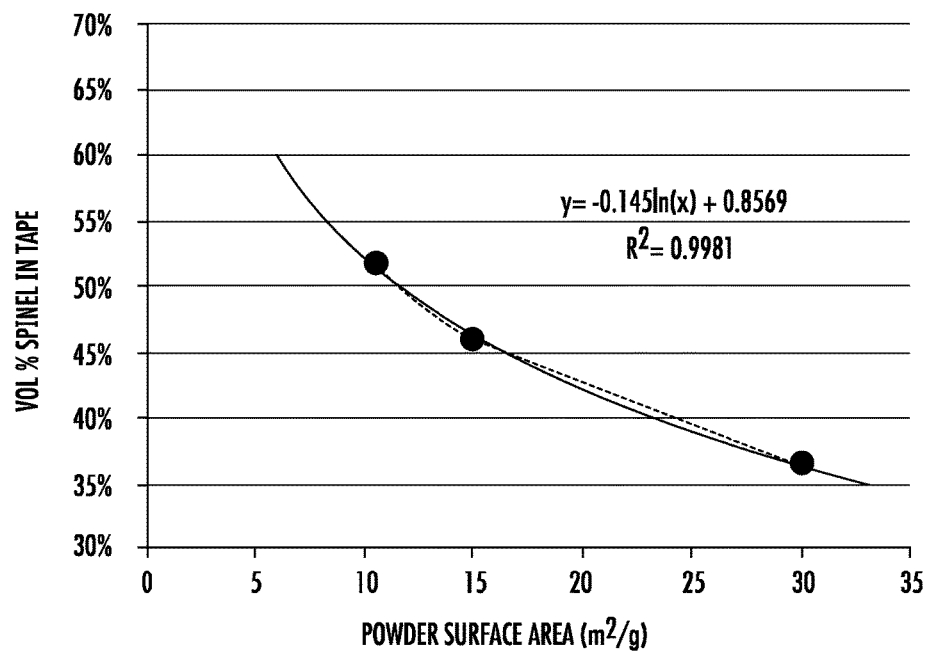
FIG. 2 shows experimental results from tapes made using three powders having different properties, and the effect on volume percent spinel in the tape.

FIG. 2 shows experimental results from tapes made using three powders having different properties, and the effect on volume percent spinel in the tape. Each powder has a different surface area (SA) (30, 15, or 10.5 $m^2/g$). The difference in green tape solids loading is indicated by the three data points. The decrease in SA of the powder allows for an increase in solids loading of the tape. A higher solids loading allows for sintering to transparency. Specific details of the BET surface area (SA) properties of the three different powders tested are contained in Table 1. Preferred tapes were made using least amounts of binder possible and which amounts did not produce tape cracking. The lower surface area (SA) powders having a relatively larger average particle size were able to use less binder and achieve a higher tape density without cracking

TABLE 1

Spinel powder properties.

| Powder Name | S30CR | S15CR | S8CR |
|---|---|---|---|
| BET SA ($m^2/g$) | 30.4 | 15.4 | 10.5 |

Table 2 summarizes the elemental analysis of the three selected spinel powder samples and lists their impurity levels.

TABLE 2

Spinel powder elemental analysis (impurities in ppm).

| Impurity | S30CR | S15CR | S8CR |
|---|---|---|---|
| Na | 40 | 34 | 8.8 |
| K | 100 | Not measured | 19 |
| Fe | 2 | 7 | 5.6 |
| Si | 33 | 26 | 43 |
| Ca | 12 | 6 | 6 |
| S | <80 | <80 | <80 |

Figure 3:
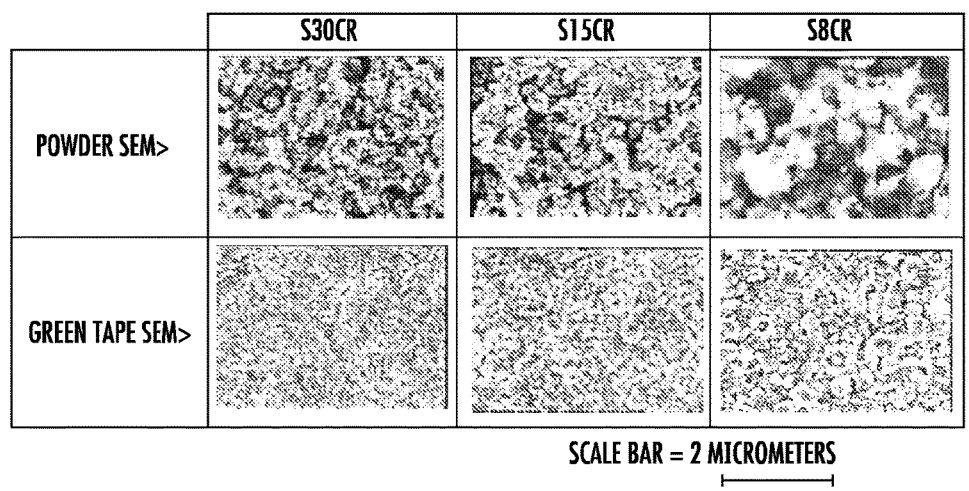
FIG. 3 shows SEM images for the as-received powders (top), and the prepared green tapes (bottom).

FIG. 3 shows SEM images for the as-received powders (top), and the prepared green tapes (bottom). Both sets of images have a two (2) micron scale bar. Of the powders tested the S15CR powder had superior results. The S30CR powder has an extremely high SA, and the tape needed a large amount of binder, such as about 15 to 20 vol % in the batch slurry and greater than about 50 vol % in the dried casted tape, to prevent cracking of the tape during drying. Although not limited by theory, each solid particle should be surrounded by organic binder material to prevent cracking. With the high binder content, the maximum solids loading in the tape was only was 36 to 37 vol %, which is too low to sinter transparent spinel. The S8CR has a higher SA, but had a non-uniform particle size distribution (PSD), as can been seen in the SEM images in top of FIG. 3. The PSD is bimodal, having large, strongly agglomerated particles of up to 1 micrometer. This PSD does not allow for uniform sintering. The S15CR powder provided tapes that were superior to the tapes prepared from the S30CR or S8CR powders. The S15CR powder has a narrow PSD and relatively low SA, which characteristics allow for excellent tape formation and sintering. Again, although not limited by theory, the available results suggest that an even more preferable powder would be similar to S15CR with the exception of having a slightly larger particle size, e.g., about 300 micrometers, and a smaller SA of, for example, about 7 $m^2/g$.

Figure 4:
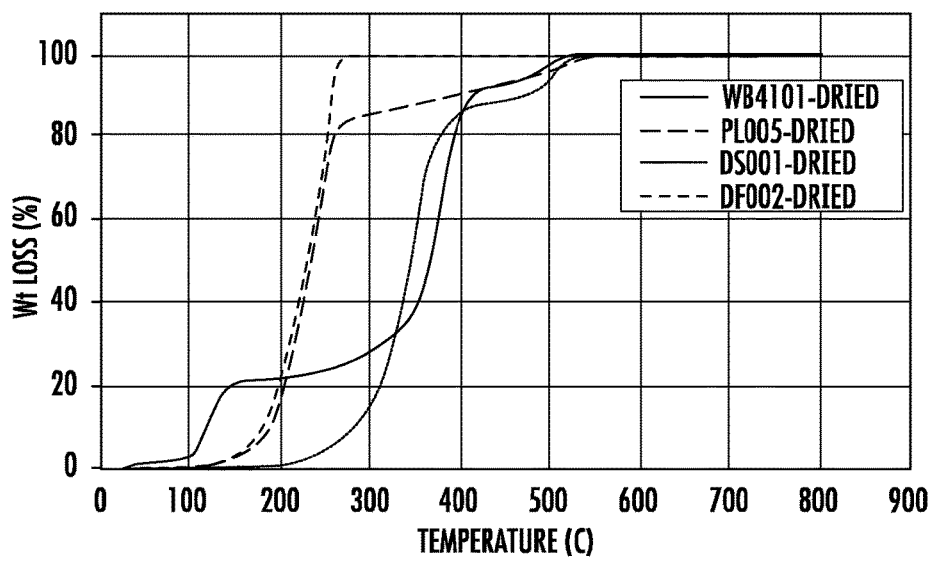
FIG. 4 shows TGA analysis for a binder system to determine a superior binder burn-off schedule for the tape.

FIG. 4 shows a TGA analysis for a binder system to determine a superior binder burn-off phenomena for the material. Notable temperatures were identified at 180, 350, and 600° C., where mass loss identified binder removal. Sintering curves based on this analysis are shown in FIG. 5.

Figure 5:
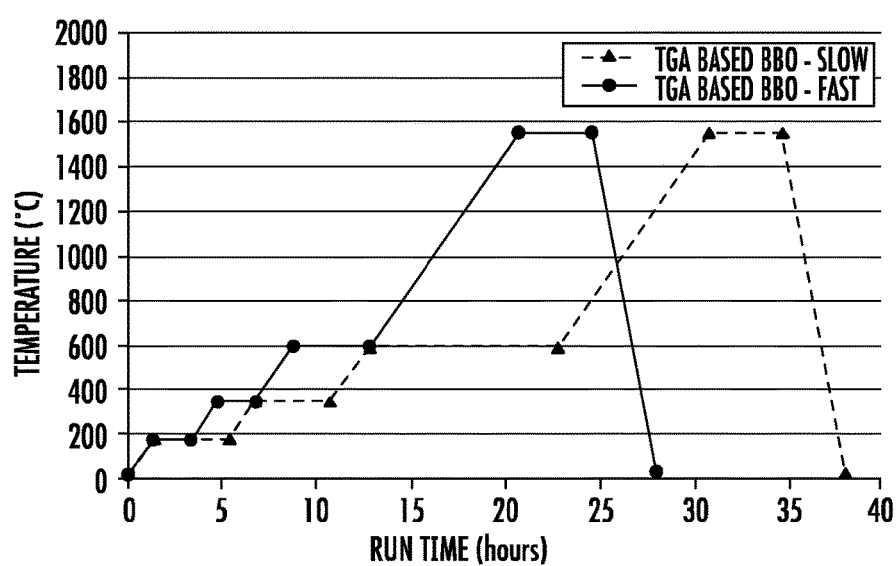
FIG. 5 shows long (triangles) and short (circles) sintering curves used for binder removal and air sintering of spinel parts.

FIG. 5 shows long (triangles; slow) and short (circles; fast) sintering curves used for binder removal and sintering of spinel parts. Notable temperature holds for binder removal and to minimize part warp/camber were at 180, 350, and 600° C. The sample was then sintered to 1550° C. to densify the part for Argon HIPing. The long sintering profile can be used for thicker or larger parts to assure that binder removal is complete. For thin, small parts the short sintering cycle has proven to be sufficient. Table 3 and 4, respectively, list the slow and fast binder burn out (BBO) schedules, and sintering schedules in greater detail. Longer dwell times can be used at notable temperatures as needed depending on part size. Alternatively, slower ramp rates can also be used for BBO (binder burn-off). The BBO is not limited to only this heating schedule.

TABLE 3

TGA based slow binder burnout (BBO) and sintering details.

| Step | Start Temp (° C.) | Ramp Rate (° C./hr) | Dwell (hr) | End Temp (° C.) | Step Time (hrs) | Total Time (hrs) |
|---|---|---|---|---|---|---|
| 1 | 25 | 120 | 0 | 180 | 1.3 | 1.3 |
| 2 | 180 | 0 | 4 | 180 | 4.0 | 5.3 |
| 3 | 180 | 120 | 0 | 350 | 1.4 | 6.7 |
| 4 | 350 | 0 | 4 | 350 | 4.0 | 10.7 |
| 5 | 350 | 120 | 0 | 600 | 2.1 | 12.8 |
| 6 | 600 | 0 | 10 | 600 | 10.0 | 22.8 |
| 7 | 600 | 120 | 0 | 1550 | 7.9 | 30.7 |
| 8 | 1550 | 0 | 4 | 1550 | 4.0 | 34.7 |
| 9 | 1550 | 480 | 0 | 25 | 3.2 | 37.9 |

TABLE 4

TGA based fast binder burnout (BBO) and sintering details.

| Step | Start Temp (° C.) | Ramp Rate (° C./hr) | Dwell (hr) | End Temp (° C.) | Step Time (hrs) | Total Time (hrs) |
|---|---|---|---|---|---|---|
| 1 | 25 | 120 | 0 | 180 | 1.3 | 1.3 |
| 2 | 180 | 0 | 2 | 180 | 2.0 | 3.3 |
| 3 | 180 | 120 | 0 | 350 | 1.4 | 4.7 |
| 4 | 350 | 0 | 2 | 350 | 2.0 | 6.7 |
| 5 | 350 | 120 | 0 | 600 | 2.1 | 8.8 |
| 6 | 600 | 0 | 4 | 600 | 4.0 | 12.8 |
| 7 | 600 | 120 | 0 | 1550 | 7.9 | 20.7 |
| 8 | 1550 | 0 | 4 | 1550 | 4.0 | 24.7 |
| 9 | 1550 | 480 | 0 | 25 | 3.2 | 27.9 |

After the initial air sintering process, the parts are argon HIPed to sinter to transparency. An alternative route to this process step includes increasing the green density of the parts, using a binder burn out process, and then hydrogen sintering, which is less costly than HIPing. Hydrogen sintering is a known process for other transparent or translucent oxide materials such as alumina for the lighting industry, and YAG for other advanced ceramic applications.

Figure 6:
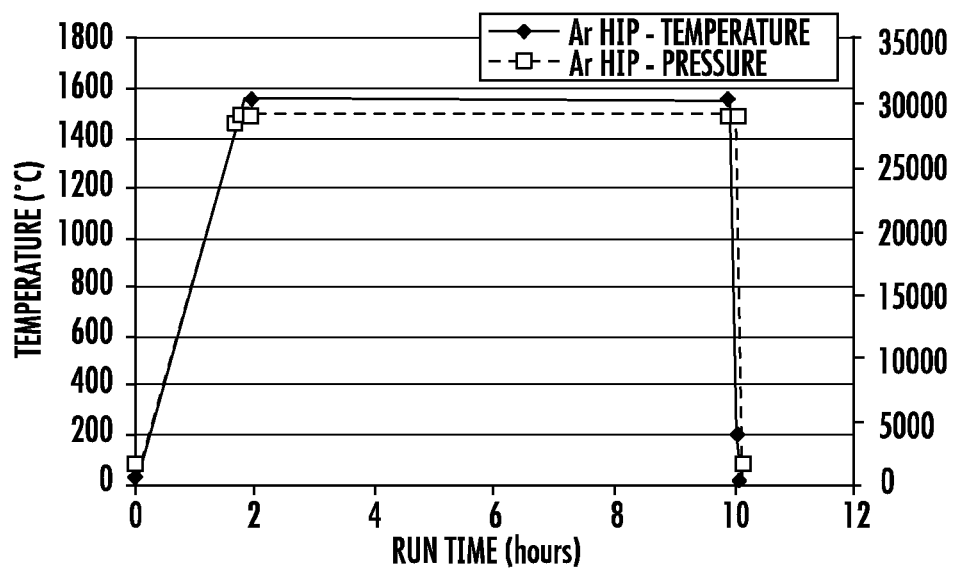
FIG. 6 shows the HIP sintering cycle having conditions defined herein.

FIG. 6 shows the HIPing sintering cycle and Table 5 provides a listing of conditions. After argon HIPing (Ar HIP), parts were oxygen HIPed ($O_2$ HIP) to removed oxygen vacancies, which vacancies can cause a darkening of the part.

TABLE 5

HIPing sintering cycle.

| Step | Start Temp (° C.) | Start Pressure (psi) | Ramp Rate (° C./hr) | Dwell (hr) | End Temp (° C.) | End Pressure (psi) | Step Time (hrs) | Total Time (hrs) |
|---|---|---|---|---|---|---|---|---|
| 1 | 25 | 1500 | 858 | 0 | 1450 | 28500 | 1.7 | 1.7 |
| 2 | 1450 | 28500 | 0 | 0.08 | 1450 | 29000 | 0.1 | 1.7 |
| 3 | 1450 | 29000 | 600 | 0 | 1550 | 29000 | 0.2 | 1.9 |
| 4 | 1550 | 29000 | 0 | 8 | 1550 | 29000 | 8.0 | 9.9 |
| 5 | 1550 | 29000 | 8100 | 0 | 200 | 29000 | 0.2 | 10.1 |
| 5 | 200 | 29000 | 2160 | 0 | 20 | 1500 | 0.1 | 10.2 |

After sintering, the sintered parts were polished as desired. The majority of the defects observed in the parts, although relatively minor, are due to surface contamination during the process. These defects can be substantially decreased, for example, by about 75% or more, when a proper cleanroom process environment is selected.

Figure 7:
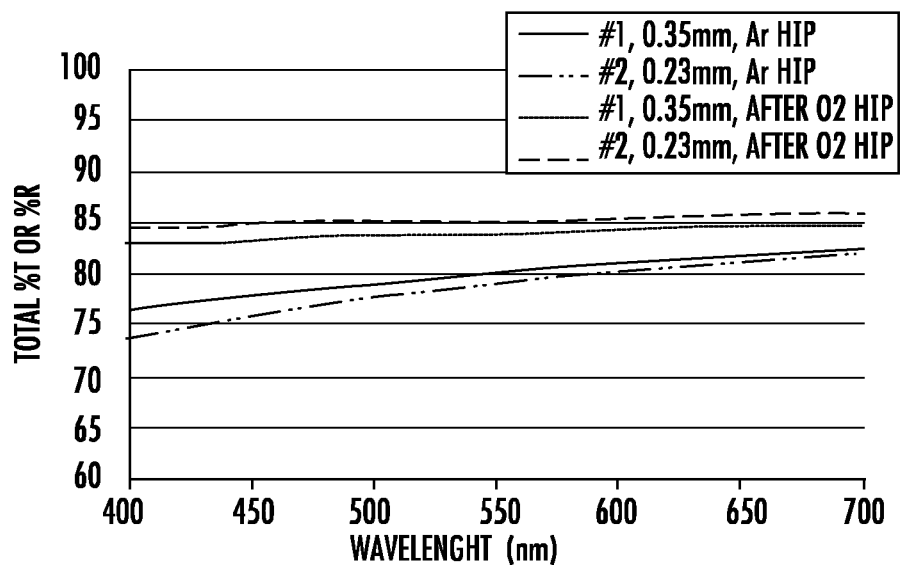
FIG. 7 shows the results of the subsequent $O_2$ HIP processing, which removes color centers, and moves the transmittance value close to the maximum.

The transmittance measurements were performed on: parts after Ar HIPing (with color centers in); and parts after Ar HIPing and then $O_2$ HIPing, to remove the color centers. FIG. 7 shows the results of the subsequent $O_2$ HIP, which removes many color centers, and moves the transmittance value (% T) to close to the theoretical maximum.

Figure 8:
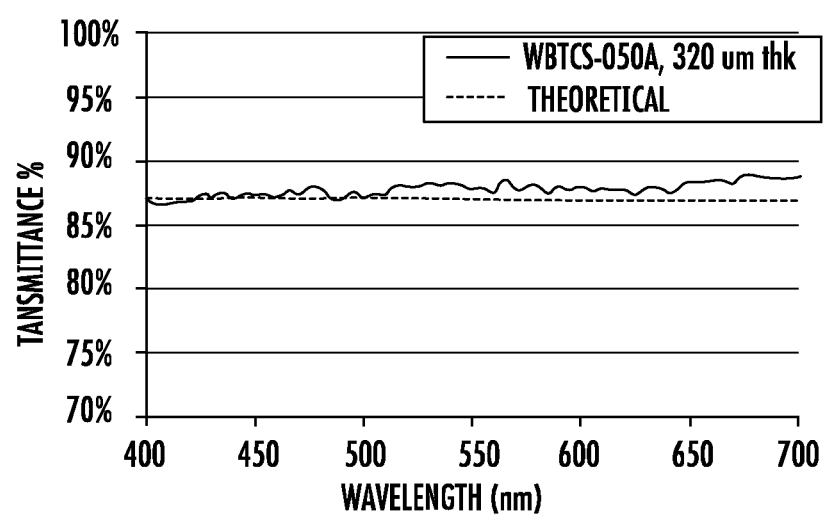
FIG. 8 shows the measured transmittance curve for parts having a thickness of about 325 micrometers that were prepared by tape firing, lamination, and polishing.

FIG. 8 shows the measured transmittance curve for the laminated, polished parts having a thickness of about 325 micrometers. Transmittance (% T) reaches the theoretical maximum value of 87% limited by refractive index. The deviation of actual from theoretical transmittance is within experimental error.

Figure 9:
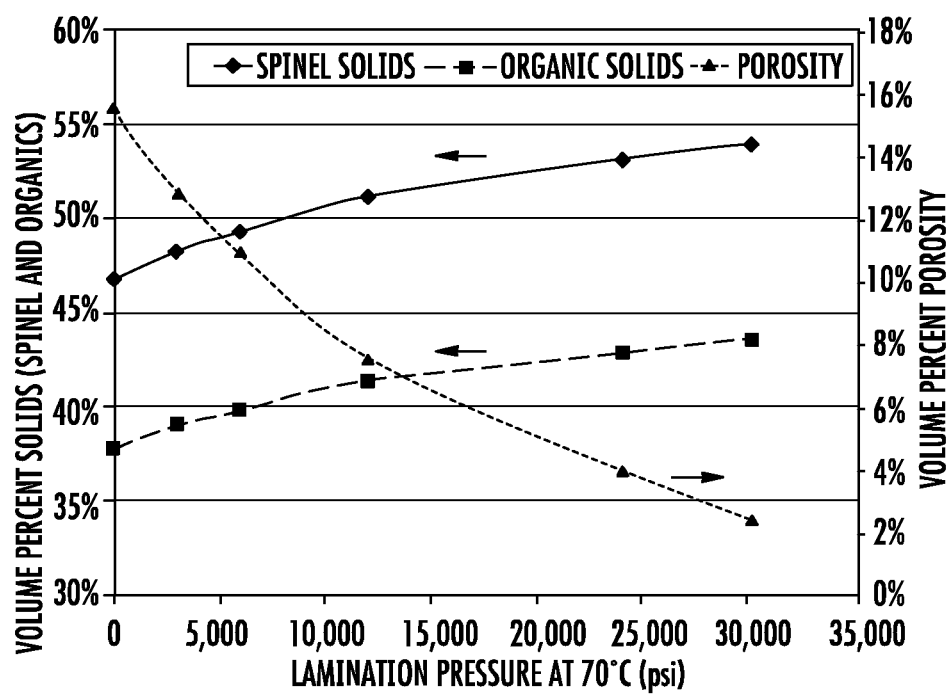
FIG. 9 is a plot that shows the effect of lamination pressure on solids loading in the green tape, which pressure removes tape porosity through compression.

FIG. 9 is a plot that shows the effect of lamination pressure on solids loading in the green tape. Batch composition of Example 1 was used. The volume percent of spinel (diamonds; left scale), organics (squares; left scale), and porosity (triangles; right scale) is plotted as cast tape (a single layer; lamination pressure=0), and five laminated samples each sample having a thickness of twenty eight (28) laminate layers formed at different lamination pressures of from 3,000 to 30,000 psi. A decrease in porosity is observed as the lamination pressure increases over 3,000 to 30,000 psi. This results in an increase in green tape solids loading from about 47% in the as-cast tape to about 54% in the sample laminated at 30,000 psi. Increased spinel solids loading in the green state allows for: improved sintering; lower temperatures; and optionally hydrogen sintering. All tapes were laminated at 70° C., held at 1000 psi for 15 minutes, then pressed to the target pressure of from 3,000 to 30,000 psi, and held for an additional 15 minutes. The results listed in Table 6 are graphically illustrated in FIG. 9.

TABLE 6

| Lamination Pressure (psi) | Spinel Solids (wt %) | Organic Solids (wt %) | Porosity (vol %) |
|---|---|---|---|
| 0 | 46.8% | 37.8% | 15.5% |
| 3000 | 48.2% | 39.0% | 12.8% |

TABLE 6-continued

| Lamination Pressure (psi) | Spinel Solids (wt %) | Organic Solids (wt %) | Porosity (vol %) |
|---|---|---|---|
| 6000 | 49.3% | 39.8% | 10.9% |
| 12000 | 51.2% | 41.3% | 7.5% |
| 24000 | 53.1% | 42.9% | 4.0% |
| 30000 | 54.0% | 43.6% | 2.4% |

Example Batch Composition Formulation for Tape Cast Slurry.

Spinel Powder.

WB4101 is a proprietary acrylic binder having additives in the solution. DF002 is a non-silicone de-foaming agent. DS001 is a polymeric dispersant. PL005 is a high pH plasticizer. These components were formulated for aqueous ceramic tape casting by Polymer Innovations, Inc., of Vista, Calif.

The components in a tape cast slurry formulation of a S15CR spinel particle batch composition are listed in Table 7A. The quantities of each component are significant for forming the disclosed tape, which tape doesn't crack, has a high green density, and can be laminated in one or more layers, that is, a plurality of layers, with itself or with other materials. This slurry has a lower viscosity due to higher water content compared to, for example, the slurry of Table 7B, and the tape cracked when trying to cast thicker tapes having a dried thickness of greater than about 50 micrometers.

The components in another tape cast slurry formulation of a S15CR spinel particle batch composition are listed in Table 7B. This formulation has improvements compared to the formulation of Table 7A. The Table 7B slurry has lower water content, and higher powder content. This leads to reduced drying stresses during the tape casting process and allows for thicker tapes having minimal cracking, up to about 100 micrometers in thickness.

Table 7C lists the quantities of each component for preparing a tape cast slurry of an S15CR spinel particle batch composition.

TABLE 7A

Batch composition for tape cast slurry.

| Component | Density | Volume Percent | Weight Percent | Name | Supplier |
|---|---|---|---|---|---|
| $H_2O$ | 1.00 | 60.25% | 42.82% | water | — |
| $NH_4OH$ | 1.00 | 3.32% | 2.36% | ammonium hydroxide | — |
| WB4101 | 1.03 | 18.28% | 13.38% | binder | Polymer Innovations |
| PL005 | 1.03 | 1.08% | 0.79% | plasticizer | Polymer Innovations |
| DF002 | 1.20 | 0.19% | 0.16% | defoamer | Polymer Innovations |
| DS001 | 1.03 | 1.72% | 1.26% | dispersant | Polymer Innovations |
| $MgAl_2O_4$ | 3.64 | 15.16% | 39.23% | S15CR particles | Baikowski |

TABLE 7B

Batch composition for tape cast slurry.

| Component | Density | Volume Percent | Weight Percent | Name | Supplier |
|---|---|---|---|---|---|
| $H_2O$ | 1.00 | 52.38% | 36.28% | water | — |
| $NH_4OH$ | 1.00 | 3.17% | 2.20% | ammonium hydroxide | — |
| WB4101 | 1.03 | 25.10% | 17.91% | binder | Polymer Innovations |
| PL005 | 1.03 | 0.80% | 0.57% | plasticizer | Polymer Innovations |
| DF002 | 1.20 | 0.22% | 0.18% | defoamer | Polymer Innovations |
| DS001 | 1.03 | 1.85% | 1.32% | dispersant | Polymer Innovations |
| $MgAl_2O_4$ | 3.64 | 16.48% | 41.54% | S15CR particles | Baikowski |

TABLE 7C

Batch composition for tape cast slurry.

| Component | Density | Volume Percent | Name | Supplier |
|---|---|---|---|---|
| $H_2O$ | 1.00 | 45 to 60% | water | — |
| $NH_4OH$ | 1.00 | 0 to 5% | ammonium hydroxide | — |
| WB4101 | 1.03 | 15 to 30% | binder | Polymer Innovations |
| PL005 | 1.03 | 0 to 5% | plasticizer | Polymer Innovations |
| DF002 | 1.20 | 0 to 5% | defoamer | Polymer Innovations |
| DS001 | 1.03 | 0 to 5% | dispersant | Polymer Innovations |
| $MgAl_2O_4$ | 3.64 | 10 to 30% | S15CR spinel powder | Baikowski |

General Overview of the Tape Casting Process

A conventional tape casting process and apparatus are disclosed and illustrated in "Principles of Ceramic Processing" by James S. Reed, 1995, $2^{nd}$ Ed., ISBN-13: 978-0471597216.

The following description introduces the disclosed method of making and identifies differences from conventional tape casting processes.

A lab scale tape casting process representative of the disclosed method of making in shown in FIGS. 1A to 1I and as discussed further below.

Batching (FIG. 1A): spinel powder was mixed with a water-based tape casting system including a binder, a dispersant, a plasticizer, and a defoaming agent.

Milling (FIG. 1B): The batched material was milled and mixed in a mill by, for example: ball milling; high shear mixing; attrition milling; vibratory milling; roller milling; and like methods.

Degassing (FIG. 1C): After milling was completed, the milling media was strained from the slurry, and the slurry was de-aired/degassed using a vacuum. This removes entrapped air from the milled product that would otherwise end up as bubbles within the mix.

Filtration: The slurry was optionally filtered to remove any large scale contamination from the mixture that would otherwise give adverse optical properties in the sintered material. Filtering can be accomplished with, for example, 50 micrometers, 25 micrometers, 10 micrometers, or 1 micrometer filters made of, for example, nylon, fiber, or other suitable materials.

Tape Casting (FIG. 1D): The slurry was then tape cast under a doctor blade at a desired thickness to form a wet, thin sheet of ceramic slurry. The wet tape was dried under controlled conditions to form a thin ceramic/polymer composite tape, referred to as a tape in the "green state" or alternatively "green tape", which can be formed to the desired shape.

Blanking (FIG. 1E): Blank (i.e., punch cut) the desired part geometry from a roll of tape from the tape casting process. Blanking forms the near net shape. Next, the final part can be formed in the green state, or formed in a post sintering process, for example, with various finishing methods, such as cutting, polishing, and like finish operations.

Stacking (FIG. 1F): Blanked layers were stacked to achieve desired part thickness after sintering. Interleaf material can be inserted between stacked parts as needed to laminate multiple parts at the same time under the same lamination process conditions.

Lamination (FIG. 1G): Desired, multiple layers of the ceramic tape can be stacked and laminated using uniaxial or isostatic pressing to create a thicker tape. This is an optional step and is only necessary if the desired tape thickness cannot be achieved in the as-cast state.

Green Forming: The green tape is optionally formed to the desired shape using any suitable ceramic forming techniques, for example: laser cutting; hot knife cutting; punching; stamping; pressing; and like methods, or combinations thereof. Alternatively or additionally, the tape can be fired and then formed to shape in the sintered state using, for example, laser cutting or slicing.

Firing/Sintering (FIG. 1H): The tape can be fired in a one or two-step process. The one step process removes binder and sinters the tape in a single firing. In the two step process the binder is removed in one furnace and then the part is sintered to final density in a second furnace. Final firing can be achieved using a hydrogen furnace, vacuum furnace, hot isostatic press (HIP), $N_2$ or Ar furnace, or an air furnace. Typical firing temperatures can be, for example, of from 1400 to 1800° C.

Polishing (FIG. 1 I): After firing, the parts can be ground, lapped, and polished to the final desired thickness and surface finish. For example, parts can be rough ground to achieve coplanarity of the top and bottom surface using, for example, silicon carbide or diamond, papers, or slurries. Yttria and alumina are also commonly used polishing agents that could be substituted as polishing agents. After achieving coplanarity, the surfaces can be polished using subsequently finer diamond slurries or tapes (e.g., 9, 6, 3, and 1 micrometer are typical sizes), and the final polishing can use a 1 micrometer diamond slurry. Finer polishes may be selected for optical applications. The polishing procedure may take from 1 to 24 hours, more typically 2 to 12 hours, and most typically 4 to 8 hours, including intermediate values and ranges.

Figure 10:
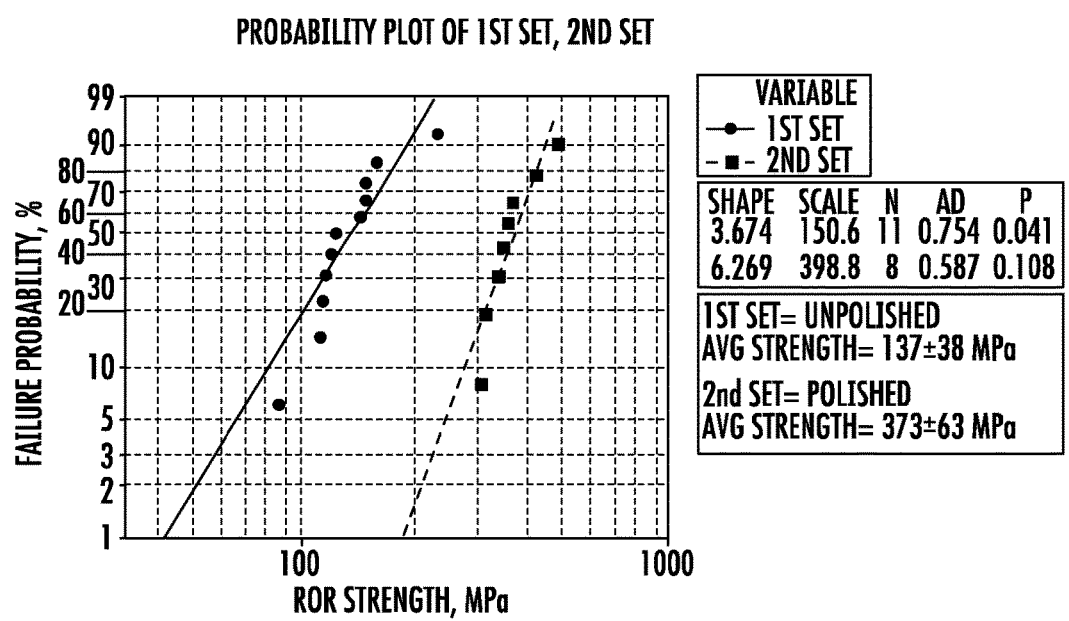
FIG. 10 is a Weibull probability plot of unpolished parts (left side points) and polished parts (right side points) and demonstrates that polishing increases the average part strength.

Referring to FIG. 10, a Weibull probability plot of unpolished parts (left side points) and polished parts (right side points) shows that polishing can increase the average ring-on-ring (ROR) part strength from 137 to 373 MPa, or provide about a 3 fold (2.72 fold by calculation) increase, or about a 172% increase in average part strength.

Significant Aspects of the Process

Milling (FIG. 1B): The milling process is a significant step which must provide fully deagglomerated particles and create a uniform, that is, a well dispersed, slurry. An attrition mill (aka.: stirred ball mill), from Union Process, is a preferred mill for achieving deagglomeration, i.e., breaking up agglomerates or nano-agglomerates of the spinel powder, which deagglomeration is difficult to efficiently and economically achieve with alternative methods. The attrition mill has benefits over other milling processes and equipment due to the high energy in-put to the materials during the milling process. This allows a batch to be milled to smaller particle sizes in a shorter period of time compared to other techniques, for example, 1 to 3 hours versus 50 to 100 hrs with ball milling.

One attrition mill used had a total volume of 750 mL and a working volume (working capacity) of 250 mL. The tank was loaded with 130 mL of slurry, and 740 grams of 1 mm 99.9% pure $Al_2O_3$ media (i.e., grinding media) from Union process. The tank was water cooled to 15° C. during the milling process to avoid overheating, and reduce evaporation of solvent(s). The slurry was initially milled for 5 minutes at 500 rpm to break down large agglomerates, then the speed was increased to 1300 rpm and milled for 1 hour. At the end of milling the tank was slowed to 170 rpm and a defoaming agent was added to remove entrapped air. The slurry was then poured through a 80 to 120 mesh screen to remove the milling media from the slurry before deairing.

Deairing (Degassing) Process (FIG. 1C): After straining the milling media from the slurry, the slurry was deaired. Deairing was accomplished with a desiccator chamber and then a Mazerustar vacuum planetary mixer. The slurry was loaded into a desiccator chamber and de-aired for up to 10 minutes. After the initial deairing, the slurry was loaded into the planetary mixer and operated under vacuum for 5 minutes. An alternative deairing procedure that can eliminate the Mazerustar mixer is to use a higher vacuum in the desiccator chamber.

Binder System: The organic binder composition is significant to the disclosed superior spinel tape casting process. A binder system from Polymer Innovations was used that includes an acrylic based binder that is soluble in high pH water, for example, from about pH 9 to 12. This binder system allows a stable spinel slurry system, which does not flocculate and gel before tape casting.

Tape Casting: Initially tape casting was performed in a standard lab environment. Samples prepared in the lab had high amounts of contamination which drastically reduced the optical quality of the material. The casting portion of the process was then moved to a class 1000 clean room. This eliminated greater than 75% of the observed defects in the material. Accomplishing the milling, deairing, and lamination steps in a clean room can reduce the contamination levels even further. Samples were tape cast on a silicone coated Mylar® film, which was approximately 50 to 100 micrometers thick. The silicone coating provides easy release of the tape material after drying. Other suitable films for tape can be, for example, Teflon®, glass, a metal belt, and like alternative materials. The slurry was passed under a doctor blade which had a gap of about 4 to 20 mils (i.e., 100 to 500 micrometers), typically a 4 mil (100 micrometers) blade height was used, to form a thin sheet of ceramic tape. After drying the thickness of the tape was 40 to 60 micrometers thick, and after sintering the thickness was about 20 to 40 micrometers thick. The casting blade was moved across the Mylar® at, for example, a speed of 10 mm/sec. The speed can be varied as needed to increase process speed, and modify the thickness of the tape.

Lamination Process: The roll of green tape, which can be, for example, from the size of a sheet of paper, to several meters wide and several hundred meters long, was blanked (punched/cut) into a desired rough shape, for example, 1, 2, or 3 inch squares, and 1 or 3 inch diameter circles. The orientation of the tape was marked so the casting direction, and top and bottom surface of the tape is known for later orientation. If the morphology of the ceramic particles is anisotropic they may preferentially align in the casting direction causing differential shrinkage in the x-y direction resulting in part camber upon sintering. Additionally, it is possible for the polymeric chains of the binder system to preferentially align in the casting direction also contributing to non-uniform shrinkage. The top and bottom surface of the tape may contain different amounts or concentrations of binder and porosity due to drying kinetics. This can result in non-uniform shrinkage in the z-direction (out-of-plane), another possible source of part camber. With the casting direction known, the tape blanks were stacked. To mitigate the effects of preferential particle orientation during casting, the tapes are rotated, 90 degrees to one another per layer (additionally, no rotation, or 180 degree rotation can be used). The tapes are typically stacked on top of one another without flipping. The bottom surface of the first layer is placed on the top surface of the next layer, and the sequence repeated for the desired number of layers. Due to drying kinetics, the bottom surface of the tape will typically contain a higher concentration of binder, while the top surface is more porous. By placing the layers atop of one another the high binder surface is compressed to the porous surface during the lamination process. It is possible to laminate two high binder surfaces together, however if two porous surfaces are laminated typically delamination was observed, unless the binder concentration in the tape is high enough to fill in the pores even at the top surface of the tape. A certain amount of porosity in the green tape is necessary to allow compression during the lamination step. Typically, a 5 to 10% porosity was targeted, but lower or higher porosities were also satisfactory. Using the desired rotation and stacking technique, the tapes are placed on top of one another and stacked to the desired number of layers. For example, from 4 to 28 layers of a green tape having a thickness of about 40 micrometers each, gave green tape laminates having a thickness of from 160 to 1120 micrometers. However, stacks having several hundred layers are possible if a thicker part is desired.

In various lamination examples, from 4 to 28 layers of tape were stacked, top-to-bottom, and orienting each added tape layer by rotating 90 degrees. The stack of tape(s) was placed between two pieces of silicone coated Mylar® ("bookends") to allow for release after the lamination process. A piece of pressure indicating paper can be placed on top of the Mylar® to visualize the pressure distribution after the process was completed. The pressure paper changes from white to red, and the darker red color, the higher the applied pressure.

The stack having the "bookends" was placed between two metal plates, vacuum sealed in a bag, and isostatically laminated (alternatively a uniaxial press can be used). Typical pressures used were 3,000 to 5,000 psi, at from 60 to 80° C. However, pressures from 1,000 to 10,000 psi, and 60 to 100° C., can be used, and more preferably 4,000 to 5,000 psi, at 70° C. The stack sample was placed in the 70° C. preheated laminator and pre-heated for 15 minutes with no or low pressure (e.g., 150 psi). The sample was then ramped to the desired pressure (e.g., 3,000 psi) and held for 15 mins. After the cycle was complete the pressure was released and the samples were removed from the chamber. The samples were allowed to cool to room temperature and removed from the lamination plates and Mylar carrier film. The sample "part" was then moved to the de-bind/sinter step, or the part can be formed in the green state using a punching or cutting method.

Figure 1H:
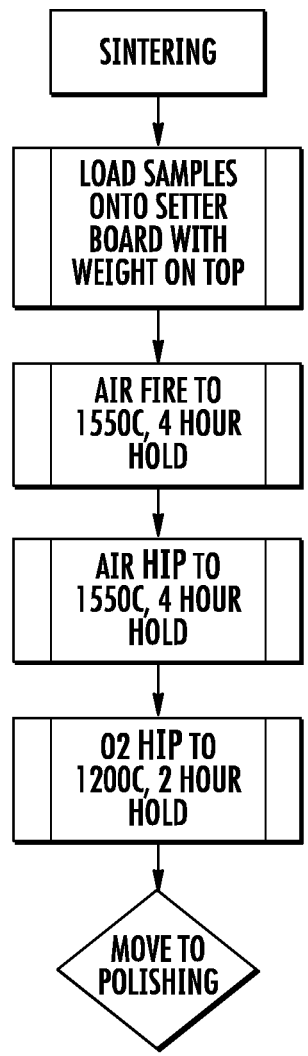
Figure 11:
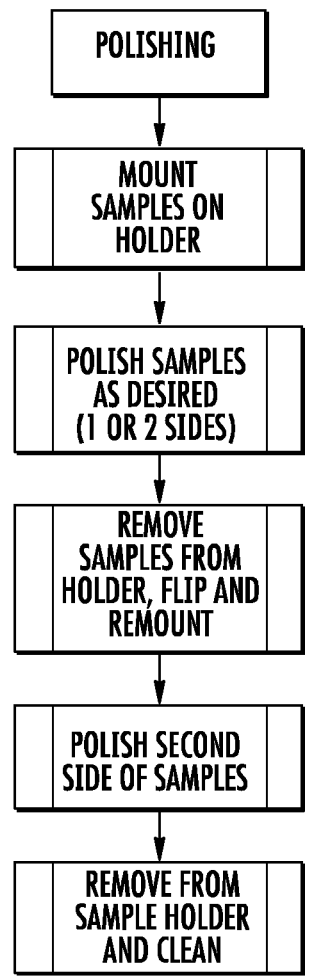

Firing Processes: After lamination, the green bodies went through a binder burnout (BBO) and a sintering process, as shown in FIG. 1H. After sintering, the fired spinel body has over 94% density, indicating that substantially all the pores were closed. To eliminate the any residual porosity, hot isostatic pressing (HIP) was used. The HIP schedules for slow and fast BBO are listed in Tables 3 and 4, respectively. A high power graphite furnace was used for the HIPing ("Ar HIP") process to achieve the high temperatures (e.g., 1,500° C. or above). After argon HIPing, the parts were dark, for example, showing color centers. Although not limited by theory, the color centers are believed to be related to oxygen vacancies within the parts, which act as light absorption centers. To increase the transmittance, the color centers are preferably removed from the parts. An "$O_2$ HIP" process was used to remove the color centers. During the "$O_2$ HIP" process, the parts were HIPed in a mixture of 80 vol % Ar and 20 vol % $O_2$ atmosphere, at about 1,000 psi or above (e.g., 10 kpsi or 5,500 psi) and 600° C. above (e.g., 1,100° C.) for several hours. Due to the high pressure of $O_2$, the color centers are eliminated by removal of the oxygen vacancies.

Table 8 lists tape cast compositions that were prepared from different spinel powder starting materials based on particle properties and different binders ratios, and having a correlation to green tape density.

Tapes were successfully prepared using the S15CR powder and having a range of powder and binder ratios. Higher binder content tape resulted in a lower cracking tendency, however these tapes were limited to low green tape thicknesses to prevent cracking Samples prepared with the S15CR powder needed a top weight during firing to hold the tape flat and minimize warping. All compositions produced good sintered part transparency independent of tape composition. Tapes made having a 50:50 or 55:45 spinel:organic ratio are preferred as they provided the best tradeoff between tape quality, transparency, and flatness.

In contrast, tapes prepared using the S30CR powder were only castable at very high binder contents and had limited tape quality, transparency, and flatness. The ability to process the S30CR based tapes was poor due to the low thicknesses required to prevent cracking Often tape tearing would occur during handling due to the extremely thin layer thickness. Translucent sintered tapes could be obtained, but the limitations due to high surface area and small particle size make the S30CR powder less suitable for a tape casting process.

The S8CR powder enabled better tape quality (i.e., thickness) and sintered part flatness at the expense of transparency. Due to the hard agglomerates and bimodal particle size distribution of the S8CR starting powder, it was not possible to create transparent parts after sintering. However, the improved green density of the tape allowed for production of thicker tapes without cracking and flat sintering without top weights on the samples.

All parts prepared during early experimental work showed some level of defects attributable to the proof-of-concept lab scale process, which introduced defects to the laminated layers.

Table 9 lists observed properties for the sintered tape cast part properties of the compositions listed in Table 8.

TABLE 8

Tape cast compositions.

| Spinel Powder ID | Theoretical Tape Composition (vol %) | | Actual Tape Composition (vol %) | | | Green Density (g/cm³) | | |
|---|---|---|---|---|---|---|---|---|
| | Spinel | Organics | Spinel | Organics | Porosity | Theo. | Actual | % Theo |
| S30CR | 48 | 52 | 37 | 40 | 23 | 2.30 | 1.78 | 77% |
| S30CR | 50 | 50 | 36 | 36 | 28 | 2.34 | 1.71 | 73% |
| S30CR | 55 | 45 | N/A | N/A | N/A | 2.47 | N/A | N/A |
| S30CR | 59 | 41 | N/A | N/A | N/A | 2.55 | N/A | N/A |
| S15CR | 50 | 50 | 44 | 44 | 12 | 2.33 | 2.04 | 88% |
| S15CR | 55 | 45 | 46 | 38 | 16 | 2.46 | 2.08 | 85% |
| S15CR | 59 | 41 | 47 | 33 | 20 | 2.57 | 2.05 | 80% |
| S15CR | 64 | 36 | 51 | 30 | 19 | 2.68 | 2.17 | 81% |
| S15CR | 67 | 33 | 47 | 22 | 31 | 2.80 | 1.92 | 69% |
| S8CR | 56 | 44 | 51 | 41 | 8 | 2.48 | 2.28 | 92% |
| S8CR | 60 | 40 | 51 | 35 | 14 | 2.59 | 2.22 | 86% |
| S8CR | 65 | 35 | 51 | 28 | 21 | 2.71 | 2.15 | 79% |

TABLE 9

Sintered tape cast part properties.

Observed Part Properties

| Powder | Tape Quality[1] | Transparency[2] | Flatness[3] | Defects[4] |
|---|---|---|---|---|
| S30CR | − | o | o | o |
| S30CR | − | o | o | o |
| S30CR | N/A | N/A | N/A | N/A |
| S30CR | N/A | N/A | N/A | N/A |
| S15CR | + | + | o | o |
| S15CR | o | + | o | o |
| S15CR | o | + | o | o |
| S15CR | − | + | o | o |
| S15CR | − | + | o | o |
| S8CR | + | − | + | o |
| S8CR | + | − | + | o |
| S8CR | o | − | + | o |

[1]Tape Quality
N/A = Tape cracked and not usable; unable to determine property.
− = Only extremely thin (i.e., less than 40 microns) tapes were castable, which avoided tape cracking; a small amount of tape cracking may be present.
o = Able to make acceptable tapes having 40 to 60 micron thickness without cracking.
+ = Able to make greater than 60 micron thick tapes without cracking.

[2]Transparency
N/A = Tape cracked and not usable; unable to determine property.
− = Parts are opaque after sintering.
o = Parts are translucent after sintering.
+ = Parts are transparent after sintering.

[3]Flatness
N/A = Tape cracked and not usable; unable to determine property.
− = Parts have warping after sintering.
o = Parts can be sintered flat with a weight on top.
+ = Parts are flat without a weight.

[4]Defects
N/A = Tape cracked and not usable; unable to determine property.
− = Large amount of defects due to raw material contamination and agglomeration of particles.
o = Some small defects present due to processing contamination.
+ = Parts were free of defects.

The particle size values were all derived from BET surface area analysis. It is difficult to measure individual nano scale particles. A formula was used to calculate average particle size for individual particles:

$$d = 6 \times 10^3 / (\rho \times S_{BET})$$

where d is the diameter or average particle size (in nm), $\rho$ is the density of spinel (3.58 g/cm³), and $S_{BET}$ is the BET measured surface area (in m²/g).

Table 10 lists the calculated average particle size diameters (d) obtained from the BET surface area analysis of commercial powders S30, S15, and S8. Although not limited by theory the "TARGET S" particle properties are expected, based on predictive modeling, to provide tape casted parts having superior properties to the actual tape casted parts disclosed herein (see also prophetic Example 2).

TABLE 10

Spinel powder particle properties.

| Spinel Powder Sample | BET (m²/g) | Density (g/cm³) | d(nm) |
|---|---|---|---|
| S30 | 30 | 3.58 | 56 |
| S15 | 15 | 3.58 | 112 |
| S8 | 10 | 3.58 | 168 |
| TARGET S | 6 | 3.58 | 279 |

Non-Aqueous Tape Casting

A non-aqueous tape casting process related to the disclosed aqueous process to make transparent spinel was also demonstrated. Spinel tapes can be made with an ethanol-based solvent system and polyvinyl butyral binder. Commercial spinel powder, Baikowski S30CR, was attrition milled for 1 hr, using 1 mm diameter 3YSZ milling media, to break up agglomerates. The composition of the mill batch (MB) is listed in Table 11.

TABLE 11

Non-aqueous Mill batch (MB) composition.

| Ingredient | wt. in MB | wt. fraction in MB |
|---|---|---|
| Ethanol | 115.65 | 0.671018 |
| Butanol | 27.9 | 0.16188 |
| Propylene Glycol | 6.3 | 0.036554 |
| Dyspersbyk-118 | 22.5 | 0.130548 |

Dyspersbyk-118 is a commercial dispersant from BYK-Chemie. Polyvinylbutyral binder (Butvar B98), dibutyl-phthalate plasticizer, and extra solvent were mixed in the mill batch to make a casting slip with component fractions shown in Table 12.

TABLE 12

Non-aqueous tape casting.

| | Material Properties | | | Slurry Properties | | | | Tape (calculated) | | Actual Tape | | |
|---|---|---|---|---|---|---|---|---|---|---|---|---|
| Component | Wt % Solids | Density | Volume Percent | Volume (cm³) | Wt % | Weight (g) | Vol % in Tape | Wt % in Tape | Weight (g) | Vol % in Tape | Wt % in Tape |
| Ethanol | 0% | 0.785 | 61.22% | 19.08 | 43.55% | 14.977 | — | — | 14.98 | — | — |
| Butanol | 0% | 0.810 | 14.31% | 4.46 | 10.51% | 3.613 | — | — | 3.61 | — | — |
| Propylene Glycol | 0% | 1.030 | 2.54% | 0.79 | 2.37% | 0.816 | 10.4% | 5.2% | 0.82 | — | — |
| D-118[1.] | 100% | 1.050 | 5.24% | 1.63 | 4.98% | 1.714 | 21.4% | 10.8% | 1.71 | 23.9% | 11.44% |
| DBT[2.] | 100% | 1.050 | 1.22% | 0.38 | 1.16% | 0.400 | 5.0% | 2.5% | 0.40 | 5.6% | 2.67% |
| PVB-98[3.] | 100% | 1.110 | 5.78% | 1.80 | 5.82% | 2.000 | 23.6% | 12.7% | 2.00 | 26.4% | 13.35% |
| MgAl$_2$O$_4$ | 100% | 3.600 | 9.69% | 3.02 | 31.61% | 10.872 | 39.6% | 68.8% | 10.87 | 44.2% | 72.55% |
| Total | | | 100.0% | 31.17 | 100.0% | 34.39 | 100.0% | 100.0% | 34.39 | 100% | 100% |

[1.]"D-118" is Dyspersbyk-118.
[2.]"DBT" is dibutylpthalate.
[3.]"PVB-98" is Butvar B98 polyvinylbutyral binder.

This slip was cast using a 14 mil doctor blade on a Teflon®-coated Mylar® carrier film. After drying the tape released well, was cut to shape, and sintered at 1,500° C. for 4 hours. The fired layer was approximately 30 micrometers thick and transparent.

Other non-aqueous systems may be applied to casting spinel tapes. For example, polypropylene carbonate (PPC) binders dissolve in carbonate solvents such as dimethyl carbonate or diethyl carbonate and can provide clean removal of the binder at low temperature with no residual carbon. Eliminating residual carbon may be especially important for achieving less than 0.1% porosity in the fired tape, which low porosity is called for to achieve high transparency. In addition, PPC binders decompose by pyrolysis and may be cleanly removed under inert atmosphere. This may provide an additional advantage in further reducing porosity at low temperature, thus reducing the level of porosity which needs to be removed through traditional sintering. Acrylic binders, which "unzip" or depolymerize rather than combust are advantageous for making ultra-low porosity fired tape.

EXAMPLES

The following Examples demonstrate making, use, and analysis of the disclosed spinel articles in accordance with the above general procedures.

Example 1

Method of Making A Tape Casted, Laminated, Transparent Spinel —S15 Powder; High Transparency An excellent method of making a transparent spinel part was performed using the S15CR powder supplied by Baikowski. This resulted in good tape quality and a high transparency part. The binder system was prepared in a 250 mL Nalgene bottle by combining 126.49 grams of deionized water, 7.66 grams of 30% aqueous ammonium hydroxide (Fisher Scientific), 62.43 grams of WB4101 binder (Polymer Innovations), 1.99 grams of PL005 plasticizer (Polymer Innovations), 0.64 grams DF002 defoamer (Polymer Innovations), and 4.60 grams DS001 dispersant (Polymer Innovations) (see batch compositions in Tables 7A, 7B, and 7C). The bottle was closed and shaken to sufficiently mix the binder solution ingredients. A 01-HDDM Union Process attrition mill equipped with a 1,400 cc Tefzel coated milling chamber, Lub-R plastic agitator disks, and 99.9% pure 1 mm Al$_2$O$_3$ milling media was used to prepare the slurry. The milling media and binder solution were added to the mill, which was then turned on to a speed of 500 rpm. With the mill running, 144.84 grams of S15CR spinel powder (Baikowski) was added. After adding the powder, the milling speed was increased to 1,300 rpm, and the slurry was allowed to mill for 60 minutes. After milling, the slurry was separated from the milling media by straining through an 80 mesh nylon screen. The slurry was degassed using a desiccator chamber and Mazerustar planetary mixer/deaerator. After degassing the slurry was loaded into a 60 mL syringe, a 11 micrometers nylon filter was attached to the end of the syringe for filtration during the casting process. Using a draw down machine, the slurry was cast under a casting blade with a 100 micrometers gap onto a silicone coated Mylar carrier film at a speed of 10 mm/sec. The tape was allowed to dry under ambient conditions (about 70° C., 35% RH), to a final thickness of about 50 micrometers. The tape was cut into 1×1 inch square pieces, which were then stacked 28 layers thick. The stacked layers were loaded between two metal plates, and vacuum sealed into an air tight bag for lamination. The parts were loaded into an isostatic laminator which had been preheated to 70° C., and pressed at 1,000 psi for 15 minutes, then 4,000 psi for 15 minutes. The sample was removed from the laminator and prepared for sintering. The sample was loaded onto a setter with a high purity alumina weight placed on top to maintain flatness. The sample was then fired in a standard box furnace in air; heated to 180° C. at a rate of 120° C./hr and held for 2 hrs, heated 350° C. at a rate of 120° C./hr and held for 2 hrs, heated to 600° C. at a rate of 120° C./hr and held for 4 hrs, heated to 1550° C. at a rate of 120° C./hr and held for 4 hrs, then allowed to cool at a rate of 480° C./hr. The sample was then transferred to a HIP for subsequent sintering to remove the final porosity and achieve transparency. The sample was heated to 1,550° C. under 29,000 psi of argon and held at temperature for 8 hours. After argon HIPing the sample was sintered in an Ar/O$_2$ mixture to remove oxygen vacancies and restore transparency. The sample was HIPed in a mixture of 80 vol % Ar and 20 vol % O$_2$ atmosphere, at 5,500 psi for 4 hrs and then allowed to cool. After finishing the sintering process, the sample was polished using a 1 micrometer diamond film for 4 hrs on each side to remove the surface layer and achieve the final desired transparency.

Example 2

Prophetic

Method of Making a Tape Casted Transparent Spinel

Example 1 is repeated with the exception that a different spinel starting powder is selected, such as a prophetic TARGET S powder (see Table 10) having an estimated BET surface area of 6 m$^2$/g, a density of 3.58 g/cm$^3$, and an estimated particle diameter of 279 nm. The tape casted product is high in transparency. A laminate having from 4 to about 28 layer of the tape casted product is produced by the above mentioned lamination process.

Comparative Example 2

Unsuccessful Method of Making A Tape Casted Transparent Spinel—S30CR Powder; No Transparency; Cracks Example 1 was repeated with the exception that a different spinel starting powder S30CR was used instead of S15CR, and slight changes were made in binder content and reduced water content to counter crack formation tendencies. The binder system was prepared in a 125 ml Nalgene bottle using 105.35 grams of deionized water, 5.58 grams of 30% ammonium hydroxide (Fisher Scientific), 39.86 grams of WB4101 binder (Polymer Innovations), 1.22 grams of PL005 plasticizer (Polymer Innovations), 1.21 grams DF002 defoamer (Polymer Innovations), and 2.95 grams DS001 dispersant (Polymer Innovations), and 92.12 grams S30CR Spinel powder (Baikowski). The batch was prepared in half the amount used for Example 1. The sample was milled, strained, degassed, filtered, cast, laminated, and sintered as in Example 1. The composition is similar to that used for the S15 powder in Example 1. The batch for this Comparative Example 2 is listed in Table 13. An increase in binder content, and a decrease in water content was used in an attempt to reduce drying stresses observed in initial casts, which stresses cause cracking. It was determined that high binder contents were needed to prevent tape cracking. The high binder contents decreased the spinel solids loading in the tape to a point where sintering to transparency was not possible.

TABLE 13

Comparative Tape Cast Spinel.

| Component | Density | Volume Percent | Weight Percent | Name | Supplier |
|---|---|---|---|---|---|
| H$_2$O | 1.00 | 58.53% | 42.43% | water | — |
| NH$_4$OH | 1.00 | 3.10% | 2.25% | ammonium hydroxide | — |
| WB4101 | 1.03 | 21.50% | 16.05% | binder | Polymer Innovations |
| PL005 | 1.03 | 0.66% | 0.49% | plasticizer | Polymer Innovations |
| DF002 | 1.20 | 0.56% | 0.49% | defoamer | Polymer Innovations |
| DS001 | 1.03 | 1.59% | 1.19% | dispersant | Polymer Innovations |
| MgAl$_2$O$_4$ | 3.64 | 14.06% | 37.10% | S30CR particles | Baikowski |

Comparative Example 3

Unsuccessful Method of Making A Tape Casted Transparent Spinel—S8 Powder; No Transparency; Low Binder Content Example 1 was repeated with exception that the spinel powder selected was the S8 powder. A similar batch composition to that used for the S15 powder in Example 1 was used and is listed in Table 14. The resulting tape cast had no transparency. The binder system was prepared in a 125 mL Nalgene bottle using 78.00 g of deionized water, 5.58 g of 30% aqueous ammonium hydroxide (Fisher Scientific), 26.00 grams of WB4101 Binder (Polymer Innovations), 1.17 grams of PL005 plasticizer (Polymer Innovations), 0.39 grams DF002 defoamer (Polymer Innovations), and 2.98 grams DS001 dispersant (Polymer Innovations), and 92.89 grams S30CR Spinel powder (Baikowski). The batch was prepared in one half the amount used for Example 1. The sample was milled, strained, degassed, filtered, cast, laminated, and sintered as mentioned in Example 1.

TABLE 14

Comparative Tape Cast Spinel.

| Component | Density | Volume Percent | Weight Percent | Name | Supplier |
|---|---|---|---|---|---|
| H$_2$O | 1.00 | 56.24% | 37.68% | water | — |
| NH$_4$OH | 1.00 | 4.03% | 2.70% | ammonium hydroxide | — |
| WB4101 | 1.03 | 18.20% | 12.56% | binder | Polymer Innovations |
| PL005 | 1.03 | 0.82% | 0.57% | plasticizer | Polymer Innovations |
| DF002 | 1.20 | 0.23% | 0.19% | defoamer | Polymer Innovations |
| DS001 | 1.03 | 2.09% | 1.44% | dispersant | Polymer Innovations |
| MgAl$_2$O$_4$ | 3.64 | 18.40% | 44.87% | S8CR particles | Baikowski |

The disclosure has been described with reference to various specific embodiments and techniques. However, many variations and modifications are possible while remaining within the scope of the disclosure.

What is claimed:

1. A transparent, tape casted, sintered spinel article, comprising:
   at least one of:
      a single layer thickness of 10 to 300 micrometers, or
      a laminate comprising a plurality of laminated single layers, the laminate having a thickness of 50 micrometers to 10 millimeters;
   the sintered spinel article having:
      a transparency of 80% to 87%; and
      a grain size of from 1 to 7 micrometers.

2. The spinel article of claim 1 wherein the article has a sintered strength of from 300 to 500 MPa.

3. The spinel article of claim 1 wherein the article has a Knoop hardness number measured with a 200 g load of from 10 to 16 GPa.

* * * * *